United States Patent [19]

Ackroyd

[11] Patent Number: 5,285,866
[45] Date of Patent: Feb. 15, 1994

[54] DRIVE TRAIN
[75] Inventor: Gordon W. Ackroyd, Johannesburg, South Africa
[73] Assignee: Joy Manufacturing Company (Africa) Limited (PTY), Johannesburg, South Africa
[21] Appl. No.: 735,508
[22] Filed: Jul. 25, 1991
[30] Foreign Application Priority Data
   Jul. 27, 1990 [ZA] South Africa .................. 90/5290
[51] Int. Cl.$^5$ .................. B60K 1/02; B60K 17/34
[52] U.S. Cl. .................. 180/248; 180/6.24; 180/6.26; 180/6.5; 180/24.09; 180/65.1; 180/233; 475/200; 475/248; 475/330
[58] Field of Search .................. 180/248, 211, 24.09, 180/24, 24.12, 6.24, 6.26, 233, 247, 22, 6.5, 6.51, 6.6, 6.66, 6.7, 197, 65.1, 65.6, 65.7; 475/200, 248, 330

[56] References Cited

U.S. PATENT DOCUMENTS

| 926,919 | 7/1909 | Adams | 180/6.26 |
| 2,659,246 | 11/1953 | Norelius | 475/248 |
| 2,850,920 | 9/1958 | Buckendale | 180/24 |
| 3,343,620 | 9/1967 | Karavias | 180/24.09 |
| 4,562,893 | 1/1986 | Cunard | 180/6.5 |
| 4,895,217 | 1/1990 | Huelkler et al. | 180/247 |
| 5,044,458 | 9/1991 | Schwarz et al. | 180/233 |

FOREIGN PATENT DOCUMENTS

| 468779 | 1/1992 | European Pat. Off. | 180/233 |
| 3446271A/1 | 12/1984 | Fed. Rep. of Germany . | |
| 2233942 | 1/1991 | United Kingdom | 180/233 |

OTHER PUBLICATIONS

The New Generation 10 SC 22 Shuttle Car—JOY pp. 2-5.
European Search Report EP 91 30 6766—pp. 1-2.

Primary Examiner—Mitchell J. Hill
Attorney, Agent, or Firm—Kirkpatrick & Lockhart

[57] ABSTRACT

The invention provides a drive train for propelling a vehicle capable of being used for transporting ore, coal or broken rock in underground mining operations. The vehicle has front and rear wheelsets, each comprising a right and left side wheel. The drive train comprises drive apparatus such as an electrically driven motor for delivering torque to at least a front wheel and rear wheel on one side of the vehicle. A torque sharing apparatus in the form of an epicyclic gear arrangement is interposed between the motor and the wheels, and operable to share torque delivered by the motor between the front and rear wheels while permitting them to rotate at different speeds in relation to each other. Front and rear transfer apparatus comprising gear trains co-operating with the epicyclic gear arrangement are provided for transferring torque to the front and rear wheels respectively. The front and rear transfer apparatus may be releasably interlocked in order to allow propulsion of the vehicle over slippery or uneven terrain.

7 Claims, 1 Drawing Sheet

DRIVE TRAIN

BACKGROUND TO THE INVENTION

This invention relates to a drive train.

Various different types of transmissions and drives exist to propel four wheeled vehicles. Such designs typically have a single power source connected to both the front and rear axles and incorporate a differential mechanism of sorts.

Alternatively, transmissions and drives exist that are based on two power sources, one for driving the wheels on the left side of the vehicle and other driving the wheels on the right side of the vehicle, the wheels on one side of the vehicle being capable of being driven independently from those on the other side. Such transmissions and drives have been used, for example, on underground coal-carrying vehicles, also known as shuttle cars, which have been manufactured by the applicant.

However, these mechanisms generally suffer from some or other defect which renders them unsuitable to allow adequately for effective different tyre rolling radii brought on by wear, pay load or under-inflation or to allow readily for locking of all four wheel drives, by the driver, when conditions demand this.

The present invention provides an alternative drive train which resolves this problem.

SUMMARY OF THE INVENTION

According to the present invention there is provided a drive train for a vehicle which has front and rear wheelsets, each with a right and left side wheel, the drive train comprising:

drive means for delivering torque to at least a front wheel and a rear wheel on one side of the vehicle;

torque sharing means interposed between the drive means and the wheels, and operable to share torque delivered by the drive means between the front and rear wheels while permitting the wheels to rotate at different speeds in relation to one another; and front and rear transfer means for transferring torque from the torque sharing means to the front and rear wheels respectively.

The torque sharing means may be constituted by an epicyclic gear arrangement. In a preferred embodiment of the invention the gear arrangement comprises planet gears simultaneously meshing with a ring gear and a sun gear. The ring gear and sun gear may be connected respectively to the front and rear transfer means, or vice versa.

The drive train may further include a first releasable interlocking means, preferably a hydraulically operable clutch that may be selected manually or otherwise, for optionally interlocking the front and rear transfer means with each other.

A first releasable engagement means, preferably in the form of a spring-engaged clutch, may be interposed between the drive means and the epicyclic gear arrangement, allowing optional disengagement of the drive means from the torque sharing means. A second releasable engagement means may be provided, preferably in the form of a spring-disengageable clutch interlinked with the abovementioned spring-engaged clutch. Torque may thereby be delivered from the drive means to the front and rear wheels by way of alternative auxiliary transfer means co-operating with the front and rear transfer means by disengaging the drive means from the torque sharing means.

The vehicle mentioned above is preferably equipped with a pair of similar drive trains of the type described above, with one drive train operating the wheels on the left hand side of the vehicle and the other drive train operating the right hand wheels. A third releasable interlocking means may be provided, preferably in the form of a spring-disengage type clutch, whereby the drive means of each drive train are optionally interlocked with each other whenever simultaneous delivery of torque by both drive means to all four wheels is required.

BRIEF DESCRIPTION OF THE DRAWING

The invention will now be described in more detail, by way of example only, with reference to the accompanying schematic drawing (FIG. 1), which illustrates diagrammatically a pair of transmission drive trains according to the invention.

DESCRIPTION OF A PREFERRED EMBODIMENT

Figure 1:
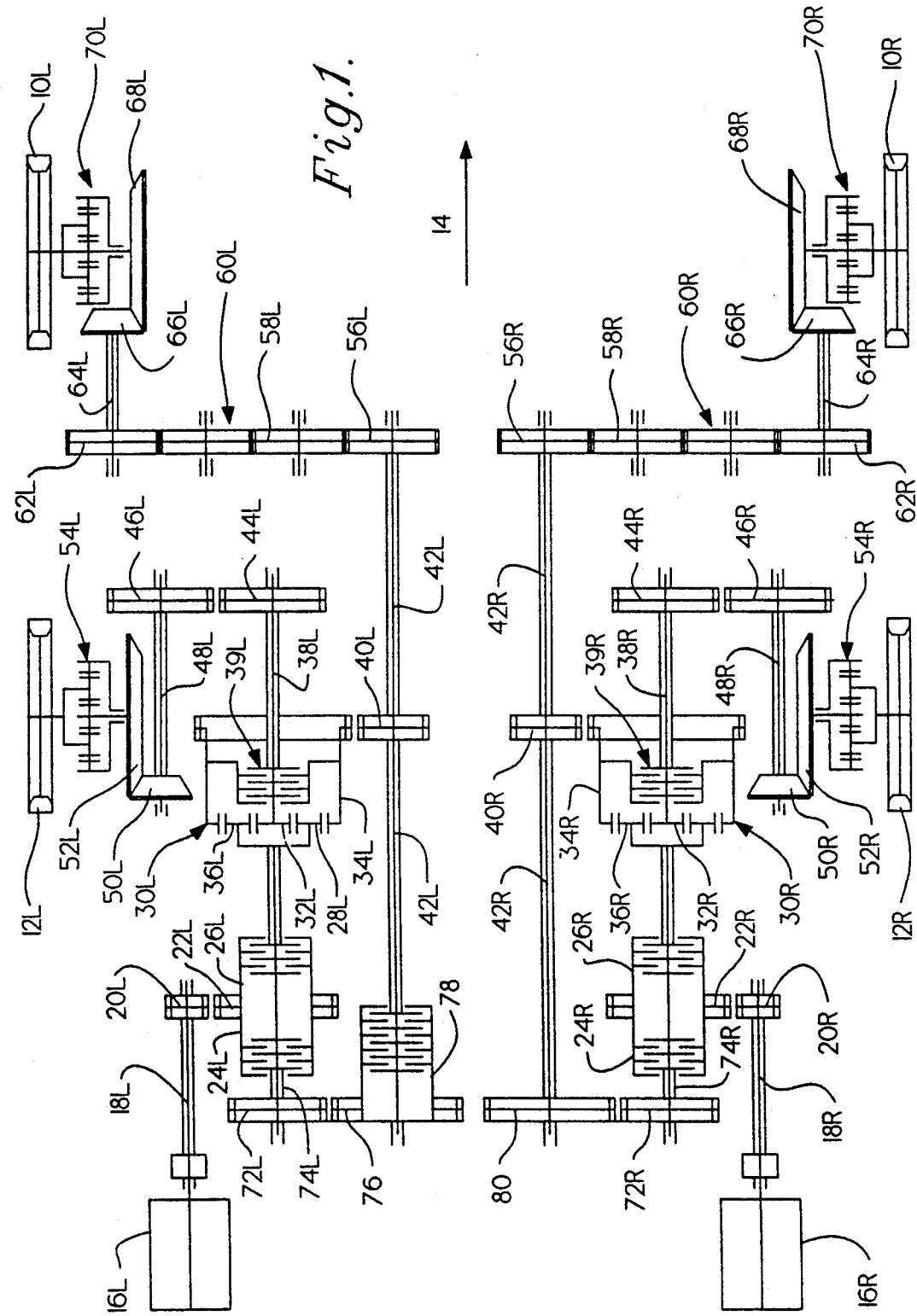

In the following description, the suffixes "L" and "R" are used to designate the respective components of a pair of drive trains respectively used to drive left front and rear wheels 10L and 12L and right front and rear wheels 10R and 12R on a vehicle for hauling coal in an underground mine, for example. The direction of forward movement of the vehicle fitted with the drive trains is indicated with the numeral 14.

The drive trains include a pair of DC electrical motors 16L and 16R. Referring to the left side components, which are identical to the right side components, the motor 16L drives an input shaft 18L carrying a gear 20L meshing with a gear 22L carrying two clutches 24L and 26L. The clutch 24L is of the spring disengaged type i.e. it is normally maintained in a disengaged state by spring forces. The clutch 26L is of the spring-engaged type i.e. it is normally maintained in an engaged state by spring forces.

This clutch arrangement conveniently comprises internally toothed clutch plates and externally toothed wear plates of the type used in known power shift transmission gearboxes manufactured by Clark Components of Statesville, N.C. in the USA, and having part reference numbers C23316 and 224772 respectively.

The clutches 24L and 26L are interlinked with each other so that each clutch respectively engages and disengages in a chosen sequence in order to ensure that both clutches are neither simultaneously engaged or disengaged, thereby ensuring that at any given time one of these clutches transmits torque from the motor 16L while the other is disabled. The clutches 24L and 26L are preferably hydraulically linked in order to permit their engagement and disengagement by means of a manually operable control lever (not shown).

In a mechanical high range mode, the clutch 26L when appropriately engaged transmits torque from the motor 16L to a planet carrier 28L of an epicyclic gear arrangement indicated generally by the numeral 30L. At this stage the clutch 24L is disengaged.

The epicyclic gear arrangement 30L comprises a sun gear 32L, a ring gear 34L and planet gears 36L, all of which are of straight spur design, meshing with each other in the manner shown in FIG. 1. The gears 32L, 34L and 36L are free to rotate about a common axis i.e. none of them is restrained. More particularly the planet gears 36L are mounted on bearings in turn supported on shafts set into the planet gears 36L are mounted on bearings in turn supported on shafts set into the planet carrier 28L, which is free to rotate about its own longitudinal axis, which coincides with the central axis of the epicyclic gear arrangement 30L.

The planet carrier 28L is conveniently regarded as the input to the epicyclic gear arrangement 30L. The sun gear 32L is mounted in bearings and is free to rotate about the central axis of the epicyclic gear arrangement 30L while meshing with the planet gears 36L, thereby providing a torque output from the epicyclic gear arrangement to the left rear wheel 12L.

The ring gear 34L forms an external body of the epicyclic gear arrangement 30L, also meshing with the planet gears and providing a torque output to the left front wheel 10L.

In use, the epicyclic gear arrangement 30L operates as a torque sharing means whereby the sun gear 32L transmits at least a portion of the torque delivered by the electric motor 16L to a shaft 38L while the balance of the torque is transmitted by the ring gear 34L to a gear 40L fast on a shaft 42L. At this stage, a clutch 39L interposed between the ring gear 34L and the shaft 38L is disengaged.

The shaft 38L carries a gear 44L meshing with a gear 46L on a shaft 48L carrying a bevel pinion 50L that meshes with a bevel gear 52L. The latter bevel gear drives the rear wheel 12L through an epicyclic gear unit 54L. The gear train 44L-46L-50L-52L-54L constitutes a rear transfer means within the meaning of the present invention.

The shaft 42L carries a gear 56L meshing with a gear 58L. The gear 58L forms part of a gear train indicated generally by the numeral 60L, and constitutes a front transfer means according to the invention, with the final gear 62L in the train transmitting drive through a shaft 64L to a bevel pinion 66L meshing with a bevel gear 68L. The latter bevel gear transmits torque to the front left wheel 10L via an epicyclic gear unit 70L.

The right side components operate in the high range mode in exactly the same way, with the left and right side wheels being independently driven. This is the normal high speed mode of operation of a vehicle served by the respective drive trains. The DC motors will themselves be infinitely variable speed motors, giving the operator various different speed choices in the high range mode.

During this mode of operation the gears 32, 34 and 36 of the left and right sided drive trains are free to rotate about the central axis of their respective epicyclic gear arrangements 30L and 30R. These respective gears do not, however, undergo any substantial movement in relation to each other during normal operation. This is mainly attributable to the simultaneous frictional contact between the front and rear wheels 10 and 12 with the underlying support surface across which a vehicle equipped with the drive trains described above generally travels. This occurs more particularly when the rolling radii of the wheels 10 and 12 are equal, and the vehicle is travelling along a horizontal, linear path. Whenever a departure from these conditions occurs, the front and rear wheels on at least one side of the vehicle will rotate at different speeds in relations to one another. The epicyclic gear arrangements 30L and 30R permit torque to be delivered to the respective front and rear wheels while they rotate at different speeds.

In a mechanical low range mode of operation, the clutch 24L is engaged and the clutch 26L is disengaged with the result that the drive to the planet carrier 28L is disengaged and torque is transmitted to a gear 72L via a shaft 74L. The gear 72L meshes with a gear 76 carried by a clutch 78 of the spring-disengaged type. The clutch 78 is engaged to transmit torque via the shaft 42L to the gear 40L. With the clutch 39L now engaged, torque is transmitted to the shaft 38L and the rear wheel 12L is driven in the manner described above for the high range mode i.e. along the train 44L-46L-48L-50L-52L-54L. At the same time, the shaft 42L drives the gear 56L and the front wheel 10L is driven in the manner described above for the high range mode i.e. along the train 60L-64L-66L-68L-70L.

It is apparent from FIG. 1 that it is of no consequence if the gear 76 and the clutch 78 are transposed in order to co-operate with the gear 72R, since the operation of the left and right side drive trains in the low mechanical range will be unaltered. Irrespective of the location of the gear 76 and clutch 78, the shaft 74L together with the gear 72L forms part of an auxiliary transfer means for transferring torque from the drive motor 16L to the wheels 10L and 12L. The gear ratios of the gears 72L, 76, 80 and 72R are selected in such a manner in order to achieve a substantial mechanical reduction in relation to a drive via the epicyclic gear arrangements 30L and 30R.

It will be appreciated that in the low range mode as described, the epicyclic gear arrangement 30L is no longer operating as a torque sharing device so that the torque transmitted to the front and rear wheels 10L and 12L is determined solely by the various gear ratios of the operative gears. In the high range mode discussed above the available torque is shared between the front and rear wheels as their demands dictate.

It will also be appreciated that in the high range mode, the epicyclic gear unit 30L acts as a differential, permitting the front and rear wheels to rotate at different speeds such as required when cornering. On the other hand, in the low range mode, no differential function is present.

Continuing with the description of the low range mode of operation of the drive train, the gear 76 carried by the clutch 78 meshes with a gear 80 and drive take place to the rear wheel 12R from the DC motor 16L along the train 80-42R-40R-34R-39R-38R-44R-46R-48R-50R-52R-54R. Drive to the front wheel 10R takes place along the train 80-42R-56R-60R-64R-66R-68R-70R.

It will be understood that the motor 16R still inputs torque to the right side components and can, in addition, transmit drive to the left side components through the engaged clutch 78.

It will therefore be understood that in the low mechanical range, the left and right sides are locked to one another by the clutch 78, and this mode of operation therefore corresponds to a full four wheel drive of the vehicle served by the dual gear trains. Although full four wheel drive of the vehicle by both motors 16L and 16R is advantageous in many instances it is apparent from FIG. 1 that the clutch 78 may be optionally omitted in other embodiments of the invention, thereby providing 2 independent gear trains between the shafts 74L and 42L, and 72R and 42R respectively. The basic essential features of the present invention will, however, be retained.

The various gear ratios in the low mechanical range of operation are chosen to give a substantial multiplication of the DC motor torque and it will be appreciated that this mode will only be employed in situations where low speed and high torque are required, e.g. when the vehicle is required to convey heavy loads up relatively steep inclines, or where the vehicle is required to scoop up broken rock from underground mine workings.

A further variation offered by the illustrated drive train is the ability to lock together, in high mechanical range, the left front and left rear wheels to turn in unison and also the right front and right rear wheels to turn in unison. This is achieved by allowing the clutches 26L and 26R to be normally engaged, clutches 24L, 24R and 78 to be normally disengaged, and by engaging either of the clutches 39L and 39R, or both. In this situation, the epicylic gear units 30L and 30R are locked and the sun gears 32L and 32R are forced to rotate at the same respective speed with the ring gears 34L and 34R.

The drive train described above is envisaged particularly for use in ore transporting equipment for underground mines. The benefit of having drive means for separately propelling the right hand and left hand wheels of this type of equipment lies in the fact that the transverse axles and their ancillary power transmission means are generally done away with.

These axles and their transmission means would generally impinge in one way or another on the holding capacity and configuration of the hopper or pan into which broken rock and ore are receivable for transport. Drive trains according to the present invention allow the provision of holding pans of greater depth and capacity with relatively little ground clearance than would have been the case with transporters equipped with transverse axles. This is a considerable advantage where the maintenance of a minimum overhead clearance is important in mines where the excavation of waste rock in order to allow the passage of transporting equipment contributes unfavourably to the overall mining cost.

Ore transporting machinery equipped with drive trains according to the present invention can generally be used with greater versatility than prior similar machinery. More particularly, when the drive train is set in the high range mode described above, with the clutches 26L and 26R engaged, ore can be transported at usual tramming speeds along non-linear passages without impedance to the rotation of the individual wheels when corners or bends are encountered along the route.

Further advantages are gained by the ability of the drive arrangement described above to allow compensation for the changes that occur in rolling radii of the tyres with the machine in a loaded and empty condition. Such ability is also useful in the case of new and worn tyres being fitted simultaneously on the same vehicle, which would give differences in rolling radii, thereby requiring the wheels to rotate at different speeds in order to impart a common forward motion to the vehicle.

If one of the wheels happens to run through a zone of low traction, e.g. a muddy zone in the footwall of a mine, and the wheel tends to spin, either clutch 39L or 39R or both clutches together, as the case may be, is engaged in order to transfer torque from the corresponding motor 16L or 16R to the wheel located on firm ground, thereby allowing the transport machine to be propelled over the muddy zone.

When the transport equipment is required for loading ore, the drive trains are conveniently set in low range by disengaging the clutches 26L and 26R and engaging the clutches 78L, 39L and 39R whereby the equipment operates in its low range mode with maximum torque being delivered to all four wheels operating in a 4-wheel drive mode of operation.

The drive train described above lends itself to a variety of adaptations and modifications, all falling with the definition of the invention set out in its broadest terms. The scope of the invention should accordingly not be construed as being limited in any way by the features of the preferred embodiment described above.

What is claimed:

1. A drive train for a vehicle which has a first lateral side and a second lateral side and includes front and rear wheelsets, each said wheelset including at least one first lateral side wheel and at least one second lateral side wheel, the drive train comprising:

first drive means for delivering torque to at least a front wheel and a rear wheel on one side of the vehicle;

first torque sharing means interposed between the first drive means and the wheels on said first lateral side of the vehicle, said first torque sharing means being operable to share torque delivered by the first drive means between the first lateral side front and rear wheels while permitting the first lateral side front and rear wheels to rotate at different speeds in relation to each other;

second torque sharing means interposed between the first drive means and the wheels on said second lateral side of the vehicle, said second torque sharing means being operable to share torque delivered by the first drive means setween the second lateral side front and rear wheels while permitting the second lateral side front and rear wheels to rotate at different speeds in relation to each other;

first front and rear transfer means for transferring torque from the first torque sharing means to the front and rear wheels on the first lateral side of the vehicle respectively;

second front and rear transfer means for transferring torque from said second torque sharing means to the front and rear wheels on the second lateral side of the vehicle respectively;

a first releasable interlocking means for optionally interlocking the first front and rear transfer means with each other; and a second releasable interlocking means for optionally interlocking said second front and rear transfer means with each other.

2. A drive train according to claim 1 in which the torque sharing means includes an epicyclic gear arrangement.

3. A drive train according to claim 1 which further includes a third releasable interlocking means for optionally interlocking a second drive means with the first and second front and rear transfer means to allow simultaneous delivery of torque by both said first and second drive means to all four wheels.

4. A drive train according to any of the preceding claims which further includes a first releasable engagement means operably interposed between said first drive means and said first torque sharing means, said first releasable engagement means being adapted to optionally disengage said first drive means from said first torque sharing means, and second releasable engagement means for selectively transferring torque from said first drive means to said first lateral side front and rear wheels, said second releasable engagement means interlinked with the first releasable engagement means for optionally disengaging the first drive means from the first torque sharing means while simultaneously engaging the first lateral side front and rear wheels with the first drive means by way of an auxiliary transfer means for transferring torque from said first drive means to said first lateral side front and rear wheels.

5. A drive train for a vehicle which has a first lateral side and a second lateral side and includes front and rear wheelsets, each said wheelset including at least one first lateral side wheel and at least one second lateral side wheel, the drive train comprising:

a first drive means for delivering torque to at least a front wheel and a rear wheel on said first lateral side of the vehicle;

a second drive means for delivering torque to at least a front and a rear wheel on said second lateral side of the vehicle;

first torque sharing means interposed between the first drive means and the wheels on said first lateral side of the vehicle, and operable to share torque delivered by the first drive means between said first lateral side front and rear wheels while permitting said first lateral side front and rear wheels to rotate at different speeds in relation to each other;

second torque sharing means interposed between the second drive means and the wheels on said second lateral side of the vehicle, and operable to share torque delivered by the second drive means between said second lateral side front and rear wheels while permitting said second lateral side front and rear wheels to rotate at different speeds in relation to each other;

first front and rear transfer means for transferring torque from the first torque sharing means to the first lateral side front and rear wheels respectively;

second front and rear transfer means for transferring torque from the second torque sharing means to the second lateral side front and rear wheels respectively;

primary releasable interlocking means for optionally interlocking the first front and rear transfer means together;

secondary releasable interlocking means for optionally interlocking the second front and rear transfer means together; and means for optionally interlocking the first and second drive means together to allow simultaneously delivery of torque by said first and second drive means to all four wheels.

6. A drive train according to claim 5 in which said first and second torque sharing means each include an epicyclic gear arrangement.

7. A drive train according to claim 6 which further includes:

a first releasable engagement means and a second releasable engagement means interlinked with the first releasable engagement means for optionally disengaging the first drive means from the first torque sharing means while simultaneously engaging the left front and left rear wheels with the first drive means by way of a first auxiliary transfer means; and a third releasable engagement means and a fourth releasable engagement means interlinked with the third releasable engagement means for optionally disengaging the second drive means from the second torque sharing means while simultaneously engaging the right front and right rear wheels with the second drive means by way of a second auxiliary transfer means.

* * * * *